United States Patent
Kawabe

(10) Patent No.: US 7,483,235 B2
(45) Date of Patent: Jan. 27, 2009

(54) POSITION DETECTING CIRCUIT, INFORMATION RECORDING APPARATUS, AND MAGNETIC DISK DEVICE

(75) Inventor: Takayuki Kawabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/475,746

(22) Filed: Jun. 27, 2006

(65) Prior Publication Data

US 2007/0230027 A1    Oct. 4, 2007

(30) Foreign Application Priority Data

Mar. 29, 2006    (JP) ............................. 2006-092490

(51) Int. Cl.
G11B 5/596    (2006.01)
G11B 5/09    (2006.01)

(52) U.S. Cl. ................... 360/77.08; 360/51; 360/78.04

(58) Field of Classification Search ....................... None
See application file for complete search history.

(56) References Cited

U.S. PATENT DOCUMENTS 6,920,004 B1 *    7/2005    Codilian et al. ............... 360/51
2001/0021075 A1 *    9/2001    Kitazaki et al. ............... 360/51

FOREIGN PATENT DOCUMENTS

JP    03-073406    3/1991
JP    2004-227735    8/2004

* cited by examiner

Primary Examiner—Andrew L Sniezek
(74) Attorney, Agent, or Firm—Greer, Burns & Crain, Ltd.

(57) ABSTRACT

The delay time from the rotation start of a magnetic disk medium (M) to a servo pattern being read is obtained with respect to a radial position from the phase delay that the trajectory of a magnetic head (H) by a rotary actuator causes with respect to the radial direction axis of the medium (M), and is reflected to the generation delay time of a servo gate signal used at servo reading.

10 Claims, 10 Drawing Sheets

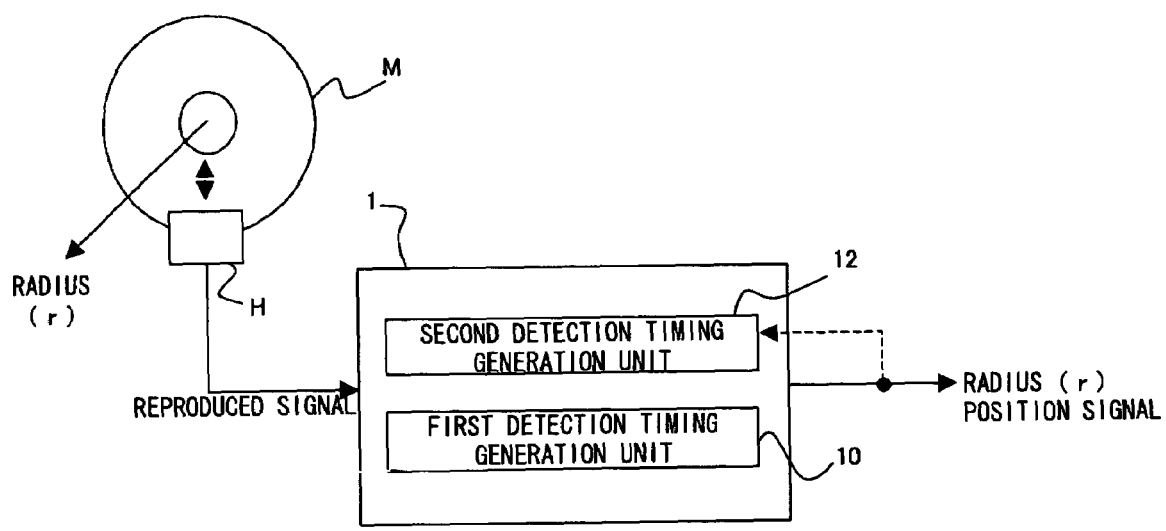
F I G. 1

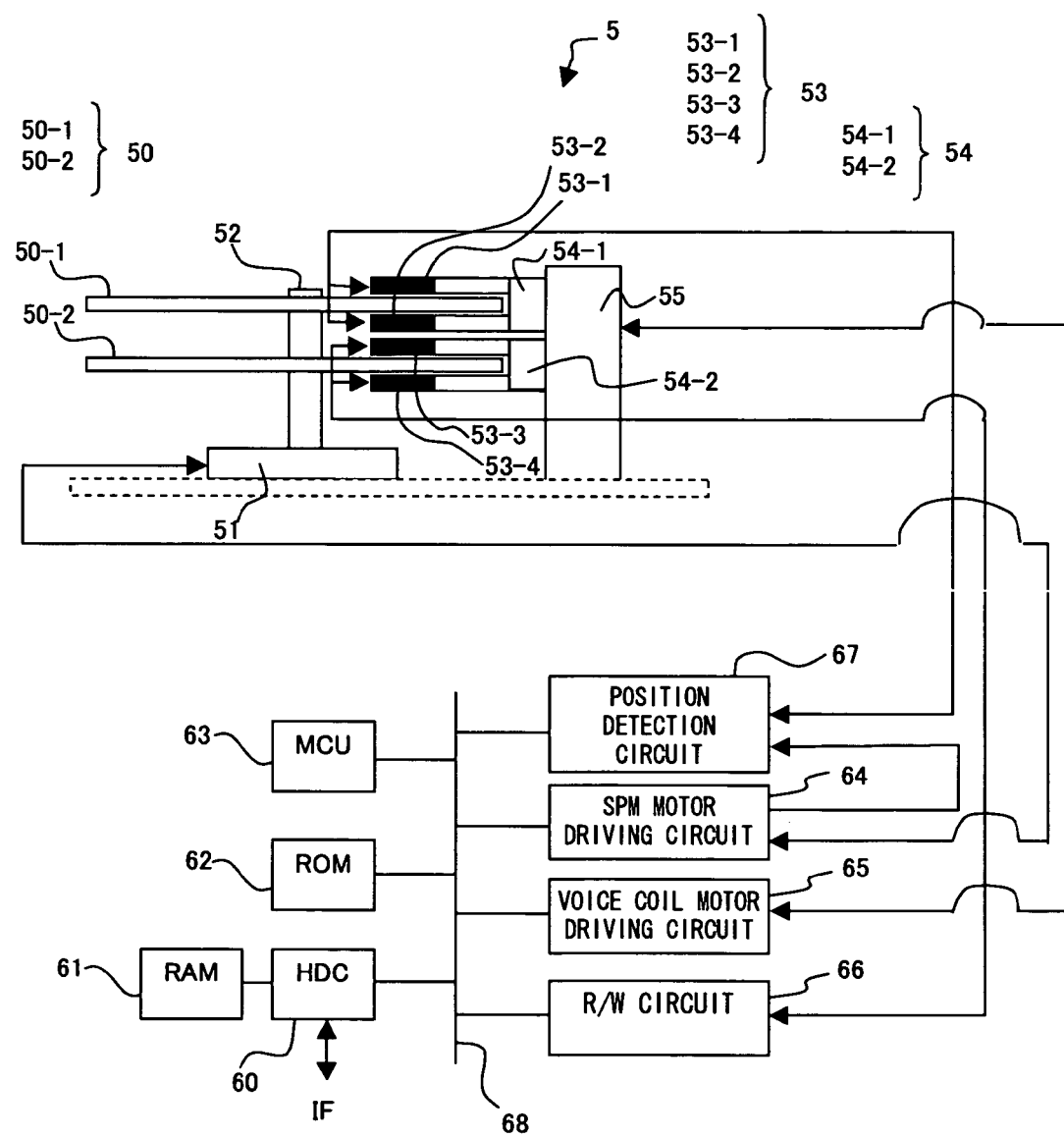
F I G. 5

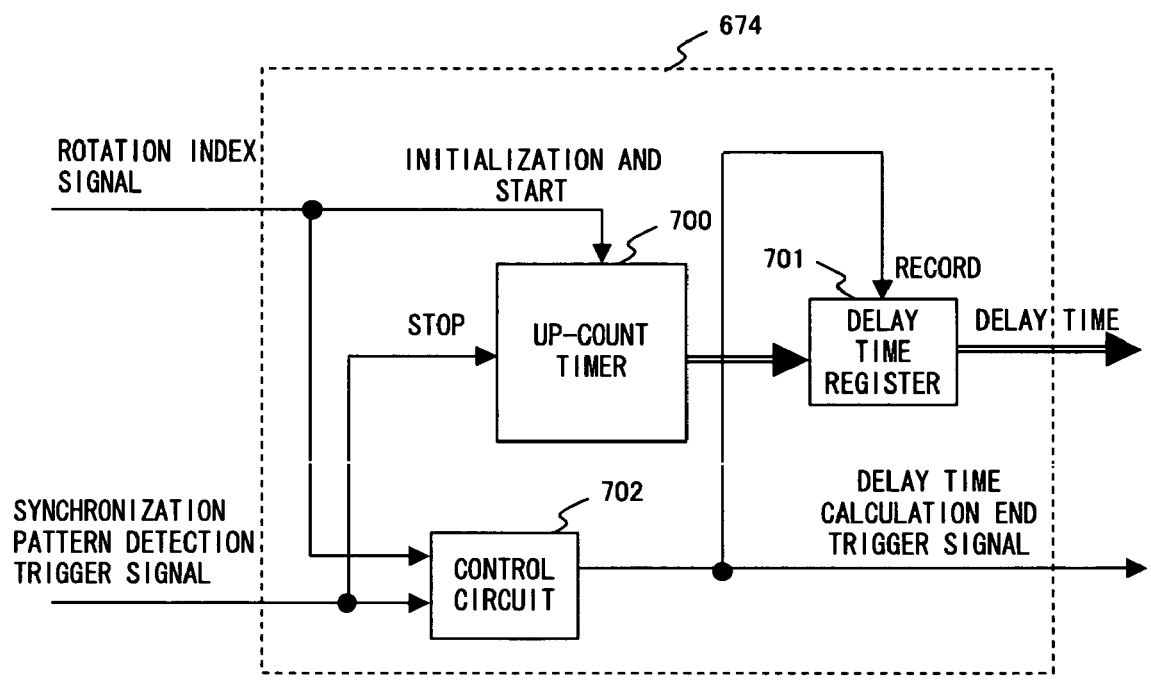
F I G. 7

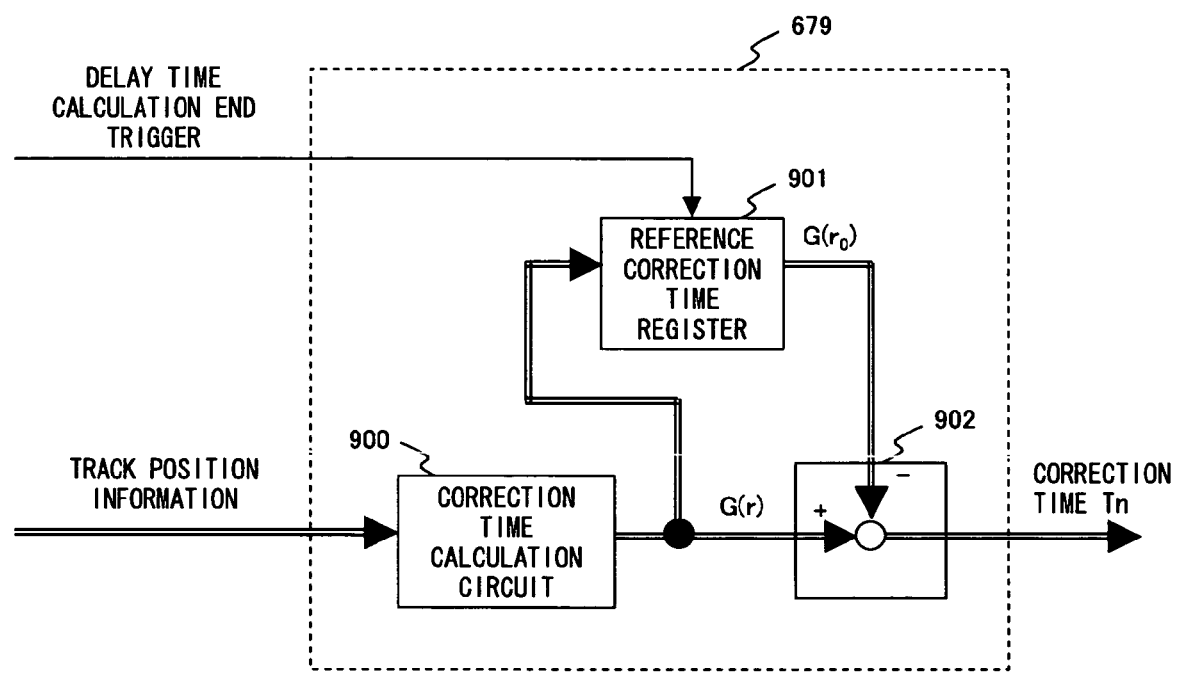
F I G. 9

POSITION DETECTING CIRCUIT, INFORMATION RECORDING APPARATUS, AND MAGNETIC DISK DEVICE

BACKGROUND OF THE INVENTION

1. Field of the Invention

The present invention relates to a position detection technology for detecting the position of a head on a recording disk medium through a servo area formed on the recording disk medium, and, in particular, relates to a position detection technology for detecting the head position on a recording disk medium from the servo area of an information recording apparatus equipped with a type of positioning mechanism that differs from the positioning mechanism used when the servo area was formed on the medium.

2. Description of the Related Art

An information recording apparatus is a device used for recording and reproducing information.

The information recording apparatus incorporates recording disk media such as a magnetic disk and an optical disk, records information to a specific address on the recording disk medium, and reproduces the information by reading from the specific address.

The address is recorded in advance on the magnetic disk as address information in a magnetic disk device incorporating magnetic disk medium, for example, and information is recorded to or reproduced from a specific address by reproducing the address information via a magnetic head.

In the typical magnetic disk medium, pluralities of tracks with concentric circles are formed from the center of the disk to the circumference. A track has a plurality of sectors, each of which is composed of a servo area and a data area, arranged on the track. In the servo area, position information indicating the position on the magnetic disk medium (a track position and a sector position, etc.) and burst information are formed in a checkered pattern (servo pattern).

The servo pattern is recorded by using a production device called a servo track writer during the production process in a manufacturing facility. The servo track writer comprises a positioning mechanism such as a spindle motor which rotates the magnetic disk medium and a rotary actuator which causes a magnetic head to travel in a radial direction of the disk, and through the use of this positioning mechanism, a mechanism in the finished magnetic disk device is used.

The controller of the servo track writer generates a clock signal accurately synchronized with the rotation of the magnetic disk medium by the spindle motor, sends to the magnetic head a record signal for the servo pattern that differs for each track by synchronizing with the clock signal, and writes the servo pattern on the traveling trajectory of the magnetic head on the magnetic disk medium determined by the positioning mechanism.

The magnetic disk medium in which the servo pattern is written is set to a magnetic disk device as well as the positioning mechanism, and shipped as a product.

Recently, a positioning mechanism that uses a rotary actuator in a magnetic disk device was implemented in many cases for the purpose of size reduction of the device.

However, the rotary actuator has a problem when writing the servo pattern. The effect of this problem is that a magnetization phenomenon occurs such that the servo pattern is erased or unnecessary servo pattern information is recorded in the vicinity of the magnetic head during the writing of the servo pattern as the yawing angle between a tangent line of the track and the magnetic head, which changes in accordance with the radial position of the magnetic head on the magnetic disk medium, increases.

In order to prevent such a phenomenon, there is a method as described in Japanese Patent-Application Publication No. 2004-227735, in which, by the servo track writing from the center of the magnetic disk toward the midpoint and from outer circumference of the magnetic disk medium toward the midpoint, the protruding direction of the magnetic field and the continuation writing direction remain constant so as not to generate undesired servo patterns. In addition to the method, there is an additional effective method, which is a method for writing the servo pattern on the magnetic disk medium by using a positioning mechanism such as a linear actuator, which does not deviate the head trajectory on the recording disk medium and the radial direction of the magnetic disk medium.

SUMMARY OF THE INVENTION

The first objective of the present invention is to provide a position detecting circuit for correcting the deviation of the servo area read timing occurring between tracks, under the premise that the position detecting circuit in an information recording apparatus comprised of a recording disk medium having more than one track with a servo area formed and rotating at a prescribed speed and a head crossing each track over the recording disk medium on a prescribed trajectory and scanning each track by the rotation of the recording disk medium, detects the position of the head on the recording disk medium from the servo area of a track where the head is located during the rotation of the recording disk medium. The position detecting circuit comprises a first detection timing generator unit for generating a first detection timing of the servo area in a track on the recording disk medium, and a second detection timing generator unit for generating a second detection timing in a track different from the track where the first detection timing is generated, in accordance with a rotation traveling time determined by the speed of rotation of the recording disk medium between a position of the servo area on the track at the first detection timing and the head position on the track.

The second objective of the present invention is to provide an information recording apparatus for correcting the deviation of the servo area read timing occurring between tracks, and the information recording apparatus comprised of the above position detecting circuit.

The third objective of the present invention is to provide a magnetic disk device for correcting the deviation of the servo area read timing occurring between tracks, and under the premise that the magnetic disk device records or regenerates by a magnetic head, the magnetic disk device comprises magnetic disk medium on which a servo area is formed in a radial pattern, a rotation positioning mechanism for controlling the magnetic head traveling on an arc on the magnetic disk medium to position in the servo area, and a detection timing generation unit for determining the timing to read information of the servo area from the magnetic head, and the detection timing generation unit delays the timing to read information of the servo area in accordance with the radial position where the magnetic head locates on the magnetic disk medium.

BRIEF DESCRIPTION OF THE DRAWINGS

FIG. 1 is a diagram showing a configuration of the position detecting circuit of the present invention and the peripheral equipment thereof;

FIG. 5 is an entire configuration of a magnetic disk device;

FIG. 7 is an example of the internal configuration of the delay time calculation circuit 674;

FIG. 9 is an example of the internal configuration of the delay time correction circuit 679.

DESCRIPTION OF THE PREFERRED EMBODIMENT

Figure 2:
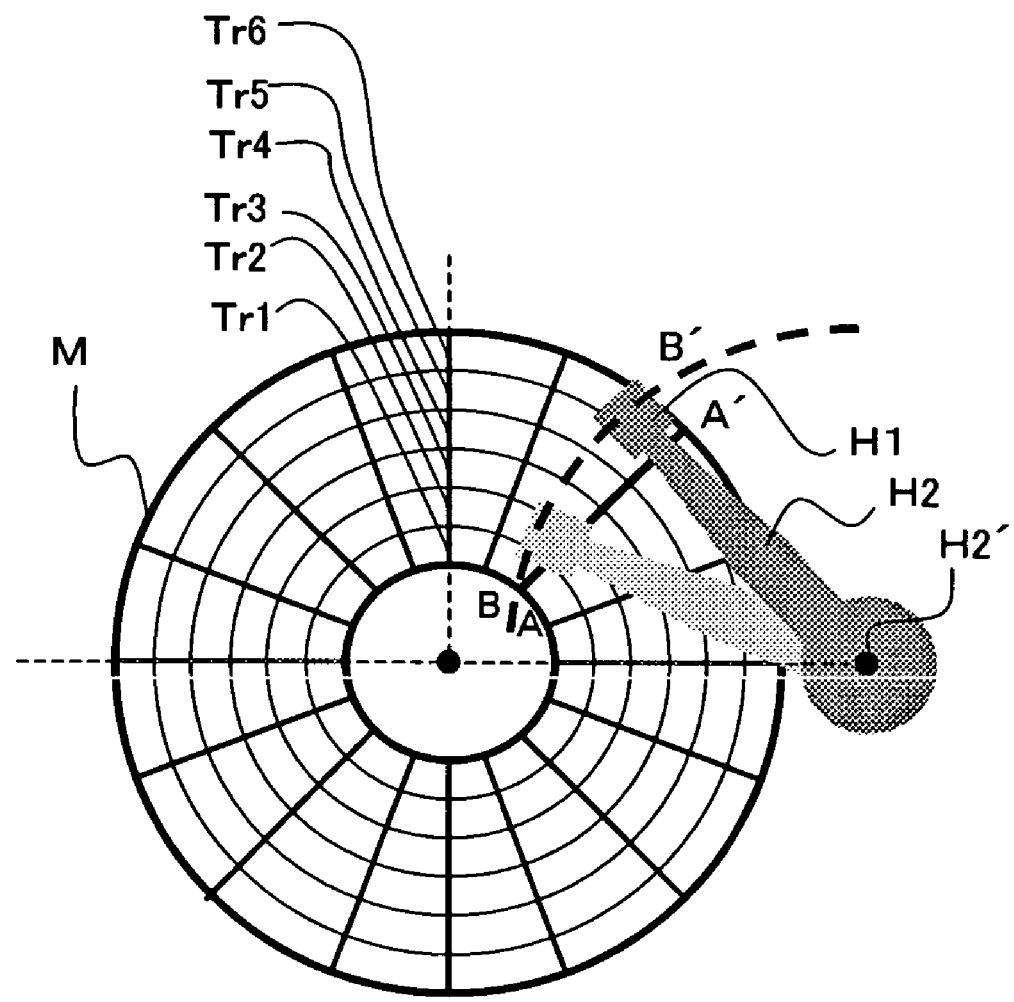
FIG. 2 is a diagram showing the difference in the head traveling trajectories.

One of the modes of the position detecting circuit of the present invention is a position detecting circuit, in an information recording apparatus comprising a recording disk medium having more than one track with a servo area being formed and rotating at a prescribed speed and a head crossing each track over the recording disk medium on a specific trajectory and scanning each track by the rotation of the recording disk medium, for detecting a position of the head on the recording disk medium through a servo area of a track where the head locates during the rotation of the recording disk medium, comprising a first detection timing generator unit for generating a first detection timing of a servo area in a track on the recording disk medium, and a second detection timing generator unit for generating a second detection timing in a track different from the track where the first detection timing is generated, in accordance with a rotation traveling time based on the speed of a rotation of the recording disk medium between the position of the servo area on the track at the first detection timing and a head position on the track.

Note that the second detection timing generation unit may comprise a function indicating a rotation traveling time for each of the tracks, obtain a difference in a rotation traveling time of another track based on a rotation traveling time of a track of which the first detection timing is generated, and generate the second detection timing by shifting the first detection timing by the difference of the rotation traveling time.

The position of a track where the head locates can be detected from information indicating the position of the track demodulated from the servo area.

Another mode of the information recording apparatus of the present invention comprises a position detecting circuit according to any one of claim 1 through claim 3.

Note that it is preferable that the information recording apparatus is configured so that the servo area of the recording disk medium is arranged in a radial pattern from the center of the recording disk medium to the outer circumference, and the head is configured so as to move across a track on the recording disk medium in an arc.

It is desirable that the head is connected to a rotary actuator.

It is desirable, in addition, that the servo area on the recording disk medium is formed on the head connected to a linear actuator.

Alternatively, the head may be configured so as to move across a track of the recording disk medium in an arc, and the server area on the recording disk medium is arranged on an arc curve with a curvature radius that is larger than an arc traveling trajectory of the head.

A third mode of the magnetic disk device of the present invention is a magnetic disk device for recording or regenerating by a magnetic head, comprised of a magnetic disk medium on which a servo area is formed in a radial pattern, a rotation positioning mechanism for controlling the magnetic head traveling in an arc on the magnetic disk medium to position in the servo area, and a detection timing generation unit for determining the timing to read information of the servo area from the magnetic head, and the detection timing generation unit which delays the timing to read information of the servo area in accordance with the radial position where the magnetic head locates on the magnetic disk medium.

It is desirable that the timing to read the information of the servo area is a timing to detect a preamble pattern in the servo area.

According to the present invention, it is possible to correct the deviation of the timing to read information of the servo area occurring between tracks. Consequently, the read timing of the servo area follows the head traveling between tracks, and accurate position information can be detected in any track.

In the following description, details of the preferred embodiments of the present invention are set forth with reference to the drawings.

FIG. 1 is a diagram showing a configuration of the position detecting circuit of the present invention and the peripheral equipment of the circuit.

FIG. 1 describes round recording disk medium M having a servo area formed on the surface, a head unit H for traveling over the recording disk medium M and for reproducing by converting information in the travel destination into an electrical signal, and a position detecting circuit 1 for extracting position information from the servo area reproducing position through a reproduced signal output from the head unit H.

A plurality of tracks in forms of concentric circles are formed on the surface of the recording disk medium M. A plurality of sectors, each of which is composed of a servo area and a data area, are arranged on each track. In the servo area of the track, information indicating the position on the recording disk medium M (a track position and a sector position, etc.) and burst information etc, are formed in checkered pattern (In this description, the information indicating the position and the burst information, etc. are given a generic name of servo information. In the following description, the above information formed in a checkered pattern is used in examples, and the pattern is referred to as servo pattern). For the formation of the servo pattern, the servo track writer is used and the writing head is positioned on a track of the recording disk medium and the servo pattern is written on the position by a positioning mechanism equipped on the servo track writer (a first positioning mechanism).

The head unit H shown in FIG. 1 is composed of a positioning mechanism, which is of a different type from that of the first positioning mechanism equipped on the servo track writer, a second positioning mechanism, and a head. The head is controlled by the second positioning mechanism so as to cross each of the tracks tracing on a prescribed trajectory over the recording disk medium M rotating at a specified speed, scanning each of the tracks using the rotation of the recording disk medium M, and reproduces the information such as a servo pattern on each track by converting it into a electrical signal.

The position detecting circuit 1 shown in FIG. 1 specifies a reproducing position of the servo pattern in the reproduced signal reproduced from the head, and detects the head position on the recording disk medium from the reproduced signal of the servo pattern. The position detecting circuit 1 comprises a first detection timing generation unit 10 and a second detection timing generation unit 12 as means for specifying the reproducing position of the servo pattern.

The first detection timing generation unit 10 is a means for generating a detection timing of the servo pattern (a first detection timing) of a track on the recording disk medium M.

In an initial stage, the detection timing of the servo pattern in the reproducing signal reproduced from the head cannot be identified in any of the tracks. Therefore, on the track where the head locates, a first detection timing signal for specifying the reproducing position of the servo pattern in the reproduced signal reproduced from the head is generated in the first detection timing generation unit in an initial stage. By generating the first detection timing signal, the reproducing position of the servo pattern is specified from the reproduced signal from the track, and the first position of the head on the recording disk medium is detected by position information demodulated from the reproduced signal of the servo pattern.

The second detection timing generation unit 12 is a means for generating the detection timing of the servo pattern (a second detection timing) on a track different from the track on the recording medium where the head was first located. As described above, the traveling trajectory of the head is controlled by positioning mechanism of a type that differs from that of the first positioning mechanism equipped on the servo track writer. Consequently, even if the reproducing position of the servo pattern is specified on the track where the head first locates, the servo pattern is not necessarily reproduced at the same timing on other track. Therefore, the second detection timing generating unit generates the second detection timing signal for specifying the reproducing position of the servo pattern from the reproduced signal reproduced from the head on the track of the traveling destination. Specifically, the second detection timing is generated based on the traveling time between the position of the servo pattern on the track of the traveling destination at the first detection timing and the head position on the track (or the rotational traveling time based on the rotation speed of the recording disk medium M).

If the rotational traveling time is obtained by a method explained later as a function with a variable being the track position, the difference between the rotational traveling time and the rotational traveling time of the other track on the basis of the rotational traveling time of the track where the first detection timing is generated can be obtained from the function. In this case, the second detection timing is generated by shifting the first detecting timing by the rotational traveling time difference. Note that because the first track position of the head is detected by the generation of the first detection timing, the track position where the head locates may be obtained by determining the head position from the traveling information obtained from the second positioning mechanism by a position detecting circuit such as an optical encoder circuit, or may be obtained by detecting from information indicating the track position demodulate from the servo pattern of each track.

Figure 3:
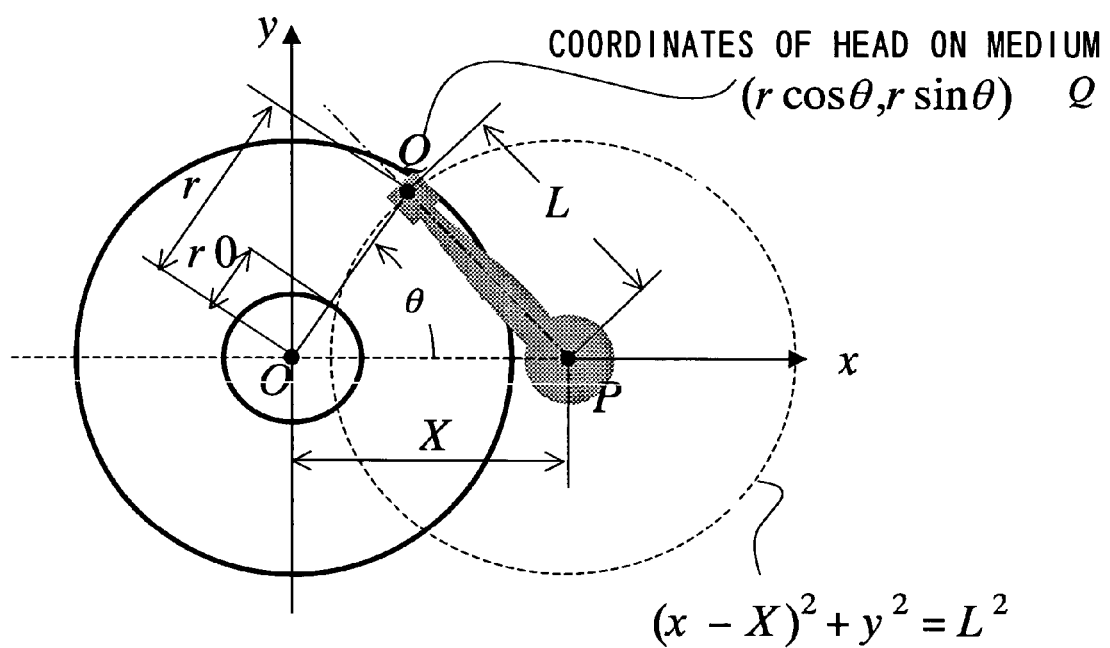
FIG. 3 is a diagram showing a relationship between the starting position of the servo pattern of each track and the position of the head H1 in each track.
Figure 4:
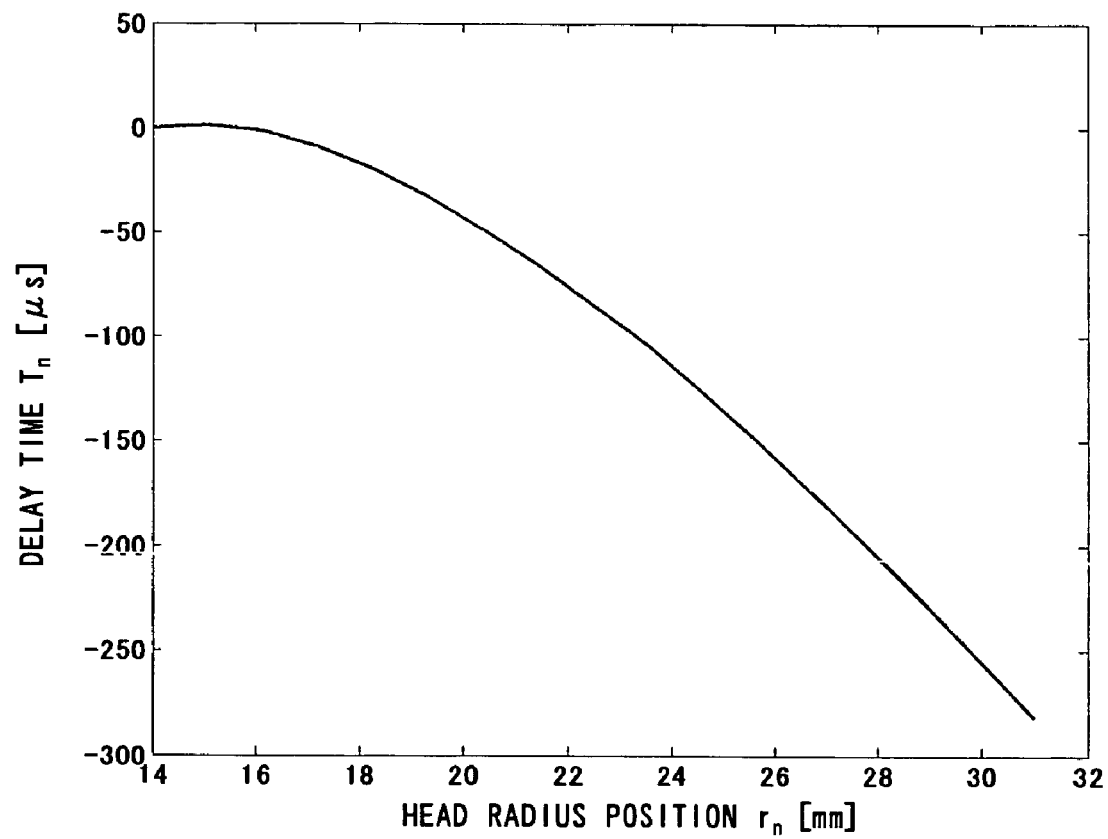
FIG. 4 is a graph showing the relation between the radius position rn and the time difference Tn.

FIGS. 2-4 consists of explanatory diagrams representing the time difference of the reproducing timing of the servo pattern by a function with a variable that is the track position in the case that a head positioning mechanism comprising a servo track writer and a head positioning mechanism used when reading information from the recording disk medium.

FIG. 2 is a diagram showing the difference in the head traveling trajectories of the positioning mechanisms.

FIG. 2 describes the relative positions of the recording disk medium having an indication of the sector arrangement on the surface and the head traveling trajectory crossing over the recording disk medium.

The recording disk medium M in FIG. 2 is rotated counterclockwise around the center by a spindle motor not shown in the drawing. Note that FIG. 2 shows the recording disk medium M being in a stationary state. The recording disk medium M of FIG. 2 has a plurality of tracks (Tr1-Tr6) separated by a plurality of concentric circles formed from the center to the outer circumference. In this example, sectors on each track are arranged in a line radiating from the center toward the outer circumference of the recording disk medium (for example, line A-A'). Within one track, a sector has a servo area to immediate right of each line, and a data area is from the servo area to the next line. The sectors arranged in such a manner are formed by a servo track writer comprising a positioning mechanism such as a linear actuator writing the servo pattern at a position of the servo area.

On the other hand, the head unit H of FIG. 2 is composed of a head H1 and a positioning mechanism (FIG. 2 shows the arm H2 alone). The positioning mechanism is loaded on a rotational axis H2' of the arm H2, and is composed of a rotary actuator controlling the rotation. The control of the rotary actuator causes the head H1 on the tip of the arm H2 to travel on a circular arc (B-B').

Here, the line A-A' showing a start position of the servo pattern on each track is compared with the traveling trajectory of the head H1.

FIG. 2 shows the recording disk medium M being in stationary state at a position where the start position of the servo pattern and the traveling trajectory of the head H1 correspond on the track Tr1, which is the track closest to the center of the recording disk medium M, for the purpose of facilitating the explanation.

As explained above, the head H1 driven by the rotary actuator moves on an arc trajectory shown in a dotted line B-B' shown in FIG. 2. Consequently, a difference occurs from the line (A-A') showing the starting position of the servo pattern as the head moves outward from the center of the recording disk medium.

In such a case, even if a clock which loads the servo pattern from the head H1 at an appropriate timing when the position of the head H1 and the starting position of the servo pattern are the same on a track 1 (in other words, a clock for specifying the reproducing position of the servo pattern from the reproduced signal reproduced from the head by the position detecting circuit), is generated, the servo pattern cannot be loaded properly with the same clock in another track, due to the difference between the head H1 and the servo pattern.

For that reason, in changing the positioning mechanism, in order to accurately load the servo patter in other tracks, the loading clock and timing need to be changed for each track.

FIG. 3 is a diagram showing a relationship between the starting position of the servo pattern of each track and the position of the head H1 in each track. In this description, based on the relationship diagram, the time difference between the loading timings caused by the difference in the traveling trajectory is represented in a function with a variable being the track position.

In FIG. 3, a two-dimensional coordinate having a variable x on the horizontal axis and a variable y on the vertical axis is shown with the rotational axis of the recording disk medium M being designated as a reference point "O".

Here, given that the coordinate of the rotational axis H2' of the arm H2 is (X (X is a constant), 0), and the distance from the rotational axis H2' of the arm H2 to the head H1 is a constant, L, because the head H1 is on the rotational trajectory of the arm H2 having a radius L, rotating on the rotational axis H2', the following relation can be obtained where the coordinate of the head being (x, y):

$$(x-X)^2+y^2=L^2 \qquad (1)$$

When the distance from the rotational axis of the recording disk medium M to the head H1 is a variable "r", and the angle between the line connecting the rotational axis of the recording disk medium M and the rotational axis H2' of the arm H2 and the head H1 locating to the rotational direction from the line on the recording disk medium M is a variable θ, the coordinate of the position Q of the head H1 on the recording disk medium M can be expressed as below using the trigonometric function:

$$x=r \cos \theta, y=r \sin \theta \qquad (2)$$

If each of the equations of (2) is assigned to the equation (1), the following can be obtained:

$$r^2-2Xr \cos \theta + X^2 = L^2 \qquad (3)$$

From the equation (3), the function expressing the angle of the head H1 at the radius r of the magnetic disk medium M can be obtained as below:

$$\theta = a \cos((L^2-r^2-X^2)/2Xr) = F(r) \qquad (4)$$

When the rotation frequency of the recording disk medium M is "f", the time required for the position of the radius r where the head H1 locates to move onto the x-axis at an angular speed can be expressed as following:

$$T=\theta/2\pi f=F(r)/2\pi f=G(r) \qquad (5)$$

In addition, if a track position where the servo pattern is written (such as a track position closest to the center of the recording disk medium) is assigned as a constant "r0" and the equation (5) is represented as T0=G(r0) so that the track position is the reference time, the above moving time when the head H1 locates on the position of the radius "rn" can be replaced by the time difference from the reference time:

$$Tn=G(rn)-G(r0), \text{ (where } n \text{ is a track number)} \qquad (6)$$

The time difference Tn is based on the time counted within one rotation of the recording disk medium when the servo pattern is obtained at the position radius r0, and corresponds to the delay time from the reference time counted within one rotation of the recording disk medium by the time the servo sector is obtained at the position of the radius r.

The function explained above is applied to the configuration for reading a servo pattern by positioning the head at the radius rn using the rotary actuator on the magnetic disk medium, to which the servo pattern is written in a radial pattern, rotating at the rotation speed f.

In the following description, a function applied to a configuration of recording disk medium to which the servo pattern is written using a second rotary actuator with an arm sufficiently longer than that of the rotary actuator used for reading the servo pattern (i.e., the recording disk medium to which a servo pattern is written on an arc curve with larger curvature radius than that of the arc curve traveling trajectory of the servo pattern reading head), instead of a recording disk medium to which a servo pattern is written in a radial pattern as an example.

In such a case, in equation (5), where the arm length of the second rotary actuator, not shown in the drawing, is L', and the distance between the rotational center of the recording disk medium and the rotational axis of the arm of the second rotary actuator is X':

$$G'(r)=(1/2\pi f) \times a \cos((L'^2-r^2-X'^2)/2X'r) \qquad (5)'$$

Based on the above equation, if the equation (5)' is expressed as T'0=G'(r0), the above moving time when the head H1 locates on the radius r can be replaced by the time difference from the reference time:

$$T'n=G'(r)-G'(r0) \qquad (6)'$$

The time difference of the loading timing of the servo pattern caused by the difference in the head moving trajectory by each rotary actuator is provided from the difference (Tn−T'n) between the equation (6) and the equation (6').

FIG. 4 is a graph showing the relation between the radius position rn and the time difference Tn shown in the equation (6). In FIG. 4, for example, demonstrates where r0=the radius of the innermost circumference of the magnetic disk medium (14 mm), f=70 Hz, X=38 mm, and L=35 mm.

As shown in FIG. 4, the time difference is 0 when the radius r=14 mm. As the radius r becomes larger (i.e., as the head position moves to the outer circumference of the recording disk medium), the time difference increases exponentially. In this example, the time difference is indicated by negative numbers, and therefore, the starting position of the servo pattern corresponds to the time delay from the reference time (delay time).

As described above, when loading from the head a servo area written by the servo track writer having a different positioning mechanism, the timing delay in each track can be expressed as a function with a variable of the radius position of the recording disk medium. Therefore, by adjusting the loading timing of the servo pattern for each radius position in the position detecting circuit 1 (the second detection timing generation unit, in particular), in accordance with the function (for example, by delaying the clock timing generated by the first detection timing generation unit), when using a positioning mechanism different from that of the servo track writer, each track accurately specifies the reproducing position of the servo pattern in the reproduced signal reproduced from the head, and detects the head position.

The following description is an example of application to a magnetic recording device.

Embodiment 1

FIG. 5 is an entire configuration of a magnetic disk device.

The upper section of FIG. 5 is a pattern diagram view of the internal configuration of the magnetic disk device, and the lower section of FIG. 5 is a circuit block diagram for controlling each unit.

As shown in the upper section, the present example has a configuration in which two magnetic disk media 50 (50-1 and 50-2) are horizontally set on a rotational axis 52 of a spindle motor 51. An upper magnetic disk medium 50-1 (corresponding to the magnetic disk medium M) comprises a plurality of tracks having concentric circles on its top surface and undersurface. The tracks have a plurality of sectors, each one of which is composed of a servo area and a data area, arranged on each of the tracks. In the servo area, information indicating the position on the magnetic disk medium (the track position and the sector position, etc.) and burst information are formed in a checked servo pattern. The servo pattern is written by the servo track writer (not shown in the drawing). This example has the assumption that every track has the same number of sectors arranged in the same interval.

The spindle motor 51 has the rotational axis 52 extending toward the top of the drawing, propagates the rotation of the motor 51 to the rotational axis 52, and rotates the two magnetic disk media 50 together on the center axis.

Reading and writing of information in each of the top surface and undersurface of the two magnetic disk media 50 are performed via magnetic heads 53 (53-1, 53-2, 53-3 and 53-4), each of which is provided on the top surface or undersurface of the each magnetic disk medium.

The magnetic heads 53 converts the servo pattern written in the magnetic disk medium 50 into an electrical signal, or writes information on the magnetic disk medium 50 after converting the electrical signal into a magnetic signal, and each of an up-down pair of magnetic heads is fixed on a pair of arms 54 (54-1 and 54-2). In other words, each arm 54 is used for each magnetic disk medium 50. In addition, a pair of the arms 54 is connected to a voice coil motor 55, and the two arms 54 operate together so that the magnetic head 53 on the leading edge of the arm crosses each track while tracing a prescribed trajectory on the magnetic disk medium 50. In this example, the configuration of the actuator indicated by the voice coil motor 55 and the arm 54 is referred to as a rotary actuator, and the rotary actuator operates in such a way that the head 53 on the leading edge of the arm rotates and crosses each track tracing a prescribed trajectory on the magnetic disk medium 50 on rotational axis of the voice coil motor 55. The trajectory of the head 53 on the leading edge of the arm is different from the head trajectory by the positioning mechanism mounted on the servo track writer.

The lower section of FIG. 5 is a block diagram of the circuit controlling each of the above units.

The circuit has a hard disk controller (HDC) 60, RAM (Random Access Memory) 61, ROM (Read Only Memory) 62, a microcontroller (MCU) 63, a spindle motor (SPM) driving circuit 64, a voice coil motor driving circuit 65, a read/write (R/W) circuit 66, and a position detecting circuit 67, all of which are connected to bus 68. The HDC communicates with the host via an interface IF such as ATA and SCSI, and controls data recording to a data area or data reproducing from the data area in a prescribed sector based on the data record instruction or the data reproducing instruction from the host. For example, HDC issues the program execution instruction to MCU, and instructs recording or reading of data to the R/W circuit when the magnetic head moves to a target sector number. Note that the data exchanged at this point in time is temporarily stored in RAM.

ROM stores a control program of MCU, etc.

MCU starts and controls the spindle motor (SPM) driving circuit, the voice coil motor driving circuit and position detecting circuit, etc., when the control program in ROM is executed.

For example, MCU detects the current position of the magnetic head from a digital position signal (explained later), the output from the position detecting circuit, and performs drive control of the voice coil motor to a target position based on the difference between the detected current position and the target position.

The SPM driving circuit performs drives by current to the spindle motor using the SPM control circuit (not shown in the drawing), based on the rotation control clock signal output from a rotation control clock oscillator, also not shown in the drawing. In addition, the SPM control circuit outputs a pulse signal to the position detecting circuit as a rotation index signal once per rotation of the spindle motor.

The voice coil motor driving circuit drives by current to the voice coil motor.

The read/write (R/W) circuit controls reading and writing of information by magnetic heads corresponding to the lower magnetic disk medium.

The position detecting circuit is provided with a rotation index signal output from the SPM driving circuit and a signal which is read by the magnetic head from the upper magnetic disk medium and reproduced electrically. The position detecting circuit detects the magnetic head position on the magnetic disk medium, and outputs the detected digital position signal to the MCU.

Figure 6:
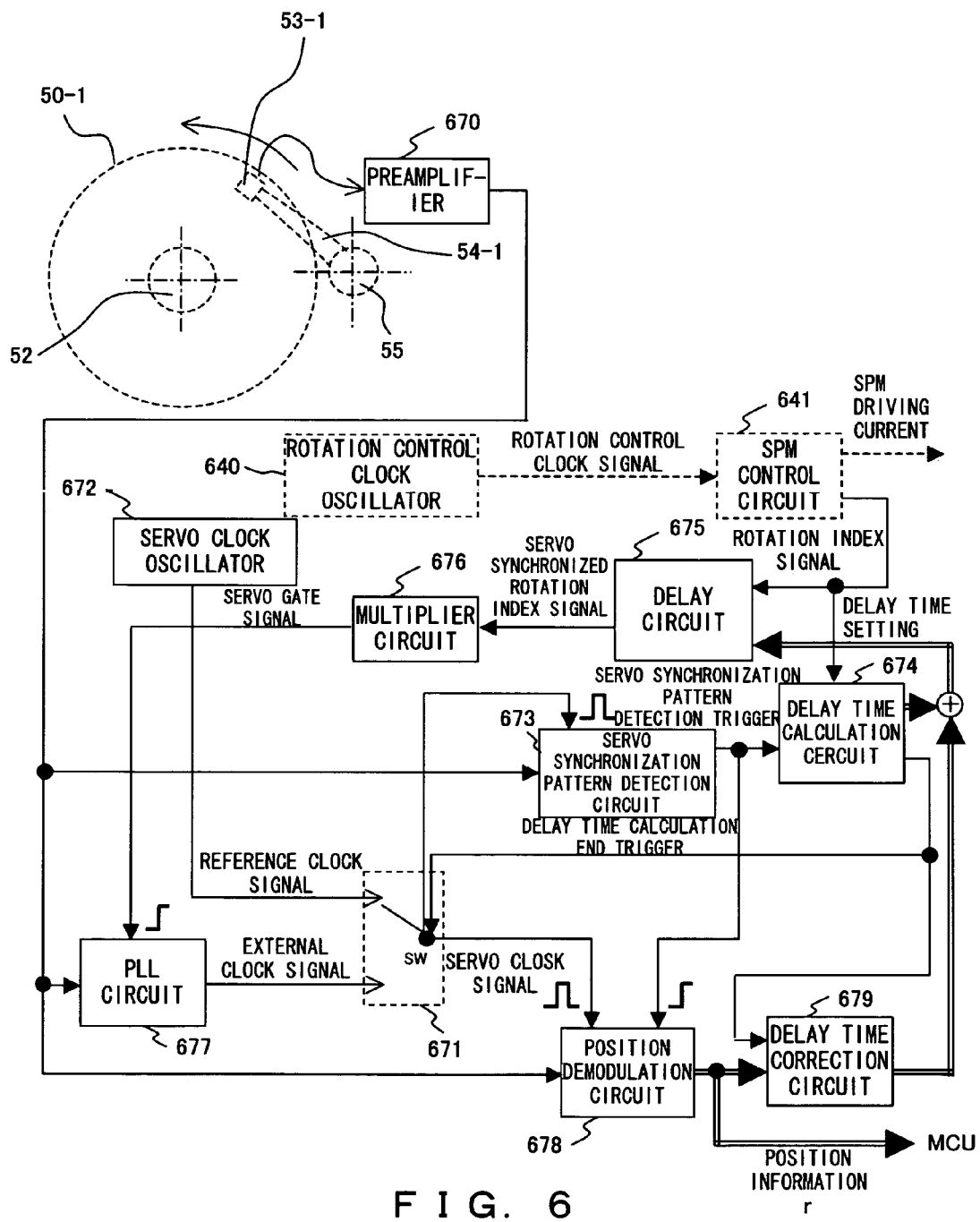
FIG. 6 is an example of the configuration of the position detecting circuit 67.

FIG. 6 is an example of the configuration of the position detecting circuit 67. The explanation of FIG. 6 is provided in the following using the detailed explanatory diagrams of the particular circuits shown in FIGS. 7-9 as appropriate.

In the following explanation, the term "reproduced signal of a servo pattern" indicates a waveform signal shown in FIG. 10(*f*). Such a waveform signal is reproduced in the order of a preamble pattern on the left of FIG. 10(*f*), a servo-synchronization pattern, and later a position modulation pattern.

In FIG. 6, the magnetic disk medium 50-1 and the magnetic head 53-1 etc. are a top view of the configuration shown in the upper section of FIG. 5.

The magnetic disk medium 50-1 is fixed on the rotational axis 52 of the spindle motor at its central axis, and rotates counterclockwise in the drawing (in the direction pointed by a solid arrow in FIG. 6) according to the spindle motor drive. The magnetic head 53-1 of FIG. 6 moves in an arc on the surface of the magnetic disk medium 50-1 by driving the rotary actuator fixed on the rotational axis 55 of the arm 54-1. It is clear that these are comprised outside of the position detecting circuit 67.

The rotation control clock oscillator 640 and the SPM control circuit 641 of FIG. 6 constitutes the SPM driving circuit 64 of FIG. 5. The SPM control circuit 641 outputs to the spindle motor (not shown in the drawing) the driving current for rotation control of the magnetic disk medium 50-1 at the rotation frequency f based on the rotation control clock signal output from the rotation control clock oscillator 640. The SPM control circuit 641 outputs the pulse signal to the position detecting circuit as a rotation index signal once per rotation of the spindle motor.

In the following description, the explanation of the position detecting circuit 67 is provided.

The position detecting circuit 67 comprises a preamplifier 670, a switch 671, a servo clock oscillator 672, a servo synchronization pattern detecting circuit 673, a delay time calculation circuit 674, a delay circuit 675, a multiplier circuit 676, a PLL (Phase Locked Loop) circuit 677, a position demodulation circuit 678, and a delay time correction circuit 679.

The preamplifier 670 amplifies the reproduced signal electrically reproduced by the magnetic head 53-1, and outputs the amplified signal (this signal is also referred to as reproduced signal hereinafter) to the servo synchronization pattern detecting circuit 673, to the PLL circuit 677, and to the position demodulation circuit 678.

The switch 671 performs input signal switch between the reference clock signal generated from the servo clock oscillator 672 and the external clock signal explained later. The switch 671 switches the input signal from reference clock signal to the external clock signal by the input of the delay time calculation end trigger (explained later) output from the delay time calculation circuit 674.

The difference between the reference clock signal and the external clock signal is such that the reference clock signal is a clock signal having a frequency generated in the servo clock oscillator 672, and the external clock signal is a clock signal having a frequency extracted from the preamble pattern in the servo area of the magnetic disk medium. This example assumes that the reference clock signal has a clock width (the width from rising edge to the trailing edge of one clock) and period sufficient to detect the servo synchronization pattern of the adjacent servo areas on the same track.

The signal selected in the switch 671 (referred to as a servo clock signal) outputs to the servo synchronization pattern detecting circuit 673 in the later stage. When the external clock signal is selected, the signal is also output to the position demodulation circuit 678.

The servo synchronize pattern detecting circuit 673 is provided with the servo clock signal selected in the switch 671 as well as the reproduced signal output from the preamplifier 670. The servo synchronization pattern detecting circuit 673 detects the servo synchronization pattern from the reproduced signal output from the preamplifier 670, and outputs a trigger signal (referred to as a synchronization pattern detection trigger signal) to the position demodulation circuit 678 and the delay time calculation circuit 674 at the timing when the position modulation pattern starts following the servo synchronization pattern.

The delay time calculation circuit 674 is inputted with the rotation index signal output from the SPM control circuit 641 as needed, and counts the delay time until the synchronization pattern detection trigger signal is inputted from the servo synchronization pattern detecting circuit 673. When the synchronization pattern detection trigger signal is inputted, information indicating the delay time count is output to the delay circuit 675, which then outputs the trigger signal indicating the end of delay time calculation (referred to as delay time calculation end trigger signal) to the switch 671 and the delay time correction circuit 679.

FIG. 7 is an example of the internal configuration of the delay time calculation circuit 674.

This example has a configuration for determining whether the output of the synchronization pattern detection trigger signal from the servo synchronization pattern detecting circuit 673 is the output generated by the detection of the servo synchronization pattern.

As shown in FIG. 7, the delay time calculation circuit 674 comprises an up-count timer 700, a delay time register 701, and a control circuit 702.

The rotation index signal output from the SPM control circuit 641 and the servo synchronization pattern detection trigger signal output from the servo synchronization pattern detecting circuit 673 are inputted to the up-count timer 700 and the control circuit 702.

The up-count timer 700 is started immediately after the count value is initialized to zero, when the rotation index signal rises, for example, and starts digitally up-counting. When the synchronization pattern detection trigger signal is input during the up-counting, the up-counting ceases, and the counted value by the time is stored in the form of a digital value.

The control circuit 702 is started by the rotation index signal similar to the up-count timer 700, and validity of the trigger signal is checked by counting the time interval of the input servo synchronization pattern detection trigger signals. In the circuit, if the time intervals between the servo synchronization pattern detection trigger signals input in sequence are equal for more than one time in a row, it is determined the servo synchronization pattern detection trigger signals was output by detecting the servo synchronization pattern, and the delay time calculation end trigger signal is outputted so that the digital value stored in the up-count timer 700 at that time is recorded in the delay time register 701. Thus, the delay time calculation end trigger signal can be propagated to the delay time register 701, and the switch 671 and the delay time correction circuit 679 outside of the delay time calculation circuit by switching the output from LOW level to HIGH level. Note that in order to perform further accurate determination of whether or not the servo synchronization pattern trigger signal is the output generated by the servo synchronization pattern detector, after the first servo synchronization pattern detection trigger signal is detected, the control circuit 702 can set up a delay corresponding to the interval of the adjacent servo areas on the same track, and after the delay, it is confirmed whether the trigger signal was detected, if at all, or whether the trigger signal is detected once in every delay period.

The delay time register 701, having the input from the delay time calculation end trigger signal, copies the digital value (referred to as delay time data) stored in the up-count timer 700 at that time, and outputs the delay time data to the delay circuit 675 in the subsequent stage. Note that the delay time data considers the time sufficiently long to perform PLL synchronization with a preamble pattern reproduced immediately before the servo synchronization pattern. The delay time data is copied to the delay time register 701 only once, at the start-up of the position detecting circuit, and afterwards, the delay time data is outputted to the delay circuit 675 in the subsequent stage when the delay time calculation end trigger signal is input.

The delay circuit 675 is input with the rotation index signal from the SPM control circuit 641 as well as the delay time calculation circuit 674, and outputs the rotation index signal (otherwise referred to as a servo synchronized rotation index signal) after the delay by delaying the phase of the rotation index signal by a time period such that the delay time data output from the delay time calculation circuit 674 and the correction time data, explained later, output from the delay time correction circuit 679 may be added.

Figure 8:
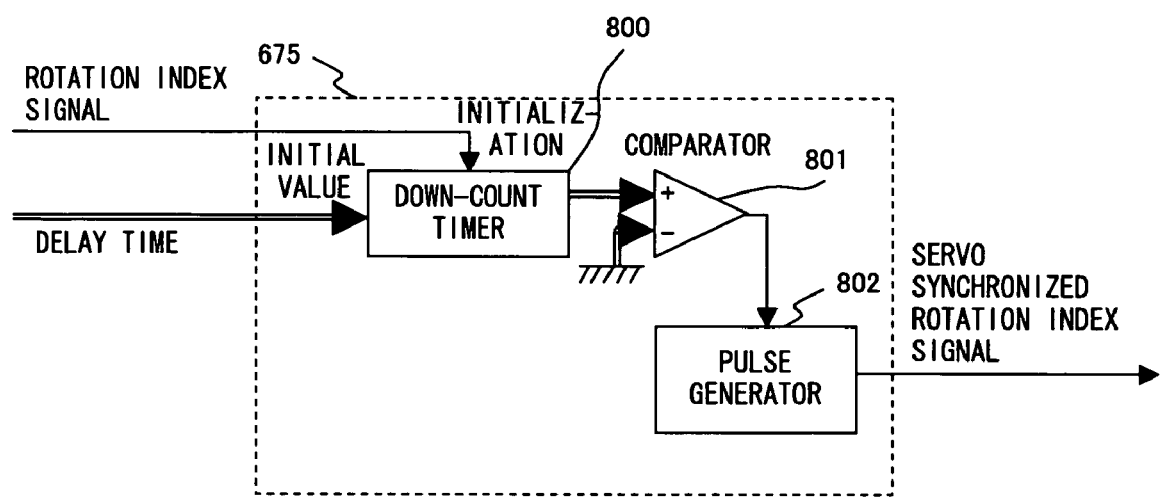
FIG. 8 is an example of the internal configuration of the delay circuit 675.

FIG. 8 is an example of the internal configuration of the delay circuit 675.

The inside of the delay circuit 675 comprises a down-count timer 800, a comparator 801, and a pulse generator 802.

The rotation index signal output from the SPM control circuit 641, and the delay time data output from the delay time calculation circuit 674, and the delay time correction circuit 649 are inputted to the down-count timer 800.

The down-count timer 800 sets the counter to the count value indicated by the delay time data at the timing, for example, when the rotation index signal rises, and performs down-counting the count value until the next rise of the rotation index signal.

The comparator 801 monitors the count value of the down-count timer 800, and outputs a trigger signal to the pulse generator 802 when the count value falls to below zero.

The pulse generator 802, when a trigger signal is received from the comparator 801, outputs a pulse signal in response to a trigger signal.

The servo synchronized rotation index signal generated in such a manner is then outputted to the multiplier circuit 676.

The multiplier circuit 676 multiplies the servo synchronized rotation index signal by the number of servo areas in one track, generates a signal (hereinafter referred to as a servo gate signal) having a prescribed clock signal, and outputs a servo gate signal to the PLL circuit 677.

The PLL circuit 677 operates from the rise through the fall of the servo gate signal, generates a clock signal (hereinafter referred to as an external clock signal) having the same frequency as the reproduced signal of the preamble pattern transmitted from the preamplifier 670 immediately after the rise, and outputs the external clock signal to the switch 671.

The position demodulation circuit 678 demodulates the position information such as the track position based on the reproduced signal of the position modulation pattern from the preamplifier 670. The external clock signal, in addition to the reproduced signal, is inputted to the position demodulation circuit 678. When the synchronization pattern detection trigger is inputted from the servo synchronization pattern detection circuit 673, the reproduced signal of the position modulation pattern, transmitted from the preamplifier 670 following the servo synchronization pattern, is demodulated to the position information using the external clock signal, and the position information is outputted. In this example, the position information demodulated in the position demodulation circuit 678 is converted by A/D conversion, and is outputted as digital information.

The delay time correction circuit 679 calculates a delay time correction value Tn based on the position information indicating the track position in the position information outputted from the position demodulation circuit 678.

FIG. 9 is an example of the internal configuration of the delay time correction circuit 679.

The delay time correction circuit 679 comprises a correction time calculation circuit 900, a reference correction time register 901, and a digital difference calculation circuit 902.

The track position information outputted from the position demodulation circuit 678 is inputted to the correction time calculation circuit 900, and the delay time calculation end trigger outputted from the delay time calculation circuit 674 is inputted to the reference correction time register 901.

The correction time calculation circuit 900 performs calculation of T=G(r) as shown in the equation (5). When the track information is inputted from the position demodulation circuit 678, T is calculated as r=track position information, and the calculated value is outputted to the reference correction time register 901 and the digital difference calculation circuit 902.

The reference correction time register 901 stores the value first outputted after the start of the position detecting circuit from the correction time calculation circuit 900 as the reference correction time T0=G(r0). Afterwards, the stored reference correction time T0 is outputted to the digital difference calculation circuit 902 every time the delay time calculation end trigger signal is inputted.

The digital difference calculation circuit 902 calculates the difference between the correction time G(rn) output from the correction time calculation circuit 900 and the reference correction time G(r0), and outputs the difference as the correction time data Tn.

The correction time data Tn output from the delay time correction circuit 679 is digitally added to the delay time data output from the delay time calculation circuit 674. The value obtained by this addition is sent to the down-count timer 800 of the delay circuit 675 as new delay time data.

Figure 10:
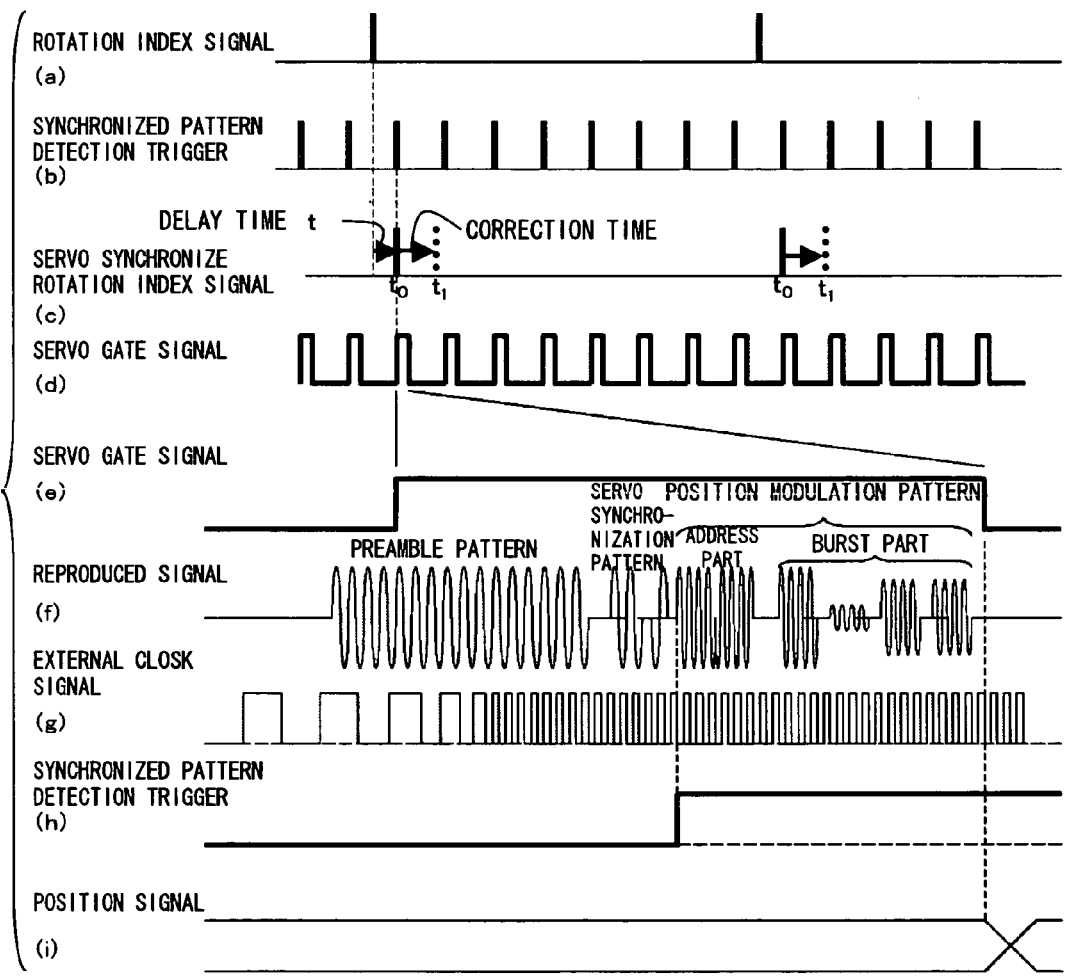
FIG. 10 is timing charts.

Next, the operation of the position detecting circuit is explained using a timing chart diagram of FIG. 10.

At the start of the position detecting circuit, the magnetic head scans an unknown track by the rotation of the magnetic disk medium. The reproducing position of the servo pattern in the reproduced signal obtained from the magnetic head is unknown at this point.

First, a timing signal (first detection timing) is generated in order to specify the reproducing position of the servo pattern at the track where the magnetic head locates.

A switch selects the reference clock signal, and provides the signal to the servo synchronization pattern detecting circuit. This switch does not output the reference clock signal to the position demodulation circuit when the reference clock signal is selected. Therefore, at this stage, the position demodulation circuit is not operated.

The servo synchronization pattern detecting circuit loads the reproduced signal reproduced in the preamplifier within each clock width of the clock signal, and seeks to detect the servo synchronization pattern in the reproduced signal. When the servo synchronization pattern is detected, the synchronization pattern detection trigger signal is outputted to the delay time calculation circuit and the position demodulation circuit not operating at this point in time. Here, the reproducing position of one or more of a plurality of servo patterns formed on the track where the magnetic head is located (more specifically, the reproducing position of the servo synchronization pattern) can be detected.

The delay time calculation circuit, over a plurality of inputs of the servo synchronization pattern detection trigger signals, checks the validity of the trigger signals, and once the validity is confirmed, data indicating the time difference between the rotation index signal counted at that time and trigger signal (delay time data) may be recorded in the internal delay time register. The delay time data is then outputted. At the same time, the delay time calculation end trigger signal is outputted to the switch and the delay time correction circuit. However, the delay time correction circuit at this stage does not operate even when the delay time calculation end trigger signal is inputted, since the position information has not be inputted from the position demodulation circuit. At this point, the time difference between the time when the servo synchronization pattern detected in the servo synchronization pattern detecting circuit is reproduced from the preamplifier and the time when the rotation index signal is inputted, is measured.

Note that the switch, by the input of the trigger signal, switches the signal selection from the reference clock signal to external clock signal generated in a way described later, and supplies the external clock signal to the servo synchronization pattern detecting circuit and the position demodulation circuit.

The delay circuit generates a servo synchronized rotation index signal by delaying the rotation index signal based on the delay time data output from the delay time calculation circuit. Here, the phases of the rotation index signals are matched to the timing when the servo synchronization pattern detected last by the servo synchronization pattern detecting circuit is reproduced from the preamplifier. In other words, the servo synchronous rotation index signal is generated based on the rotation index signal, and is a signal matching to the reproducing timing at which the servo synchronization pattern of a servo area formed on the track where the magnetic head locates is reproduced from the preamplifier.

The servo synchronize index signal is next multiplied by the number of the servo area in a track using the multiplier circuit, and in addition, a servo gate signal having a clock width sufficiently long for synchronization in the PLL circuit in a preamble pattern reproduced immediately before the servo synchronization pattern is obtained. The servo gate signal generated at this point in time rises during the preamble patterns, reproduced in sequence from the preamplifier, of all servo areas formed on the track where the magnetic head is located, and falls at the end position of the servo area over the servo synchronization pattern reproduced following each preamble pattern and the position modulation pattern. In other words, at this stage, a timing signal (servo gate signal) is generated for specifying the reproducing position of the servo pattern in the track where the magnetic head is located.

The PLL circuit 677 loads the reproduced signal transmitted from the preamplifier at the timing of the rising edge of each clock of the servo gate signal, and generates the external clock signal having the same frequency as the reproduced signal of the preamble pattern. The external clock signal is outputted to the switch 671.

In this stage, the switch has selected the external clock signal as an input signal. For that reason, the external clock signal generated in the above manner is supplied to the servo synchronization pattern detection circuit and further to the position demodulation circuit instead of the reference clock signal.

In the servo synchronization pattern detecting circuit, the above operation is performed at the timing of the external clock signal instead of the reference clock signal, and the synchronization pattern detection trigger signal is outputted to the delay time calculation circuit and the position demodulation circuit.

FIGS. 10(*a*) and (*b*) show the timings of the rotation index signal and the synchronization pattern detection trigger.

FIG. 10(*a*) shows the rotation index signal output for every rotation of the magnetic disk medium, and the pulse signal shown at the time t0 of FIG. 10(*b*) is the synchronization pattern detection trigger signal output when the servo synchronization pattern is detected in each servo area of a track. In the previous cycle, the number of the trigger signal was small; however, the number of the trigger signal output in this cycle corresponds to the number of all servo areas in a track.

The delay time calculation circuit performs the same process as described above, and outputs the delay time calculation end trigger signal as well as outputting the delay time data recorded in the delay time register. However, in this example, the record of the delay time data to the delay time register is made only the first time after the start of the position detecting circuit, and therefore, in this cycle and thereafter, the first recorded delay time data is outputted. Note that in this cycle, the currently calculated delay time data matches the previously recorded delay time data.

Another circuit (position demodulation circuit), to which the servo synchronization pattern detection trigger is input, demodulates the position modulation pattern signal reproduced following the servo synchronization pattern, and outputs the position information in digital data form to the delay time correction circuit and MCU (not shown in the drawing). The reproduced signal from the preamplifier is inputted to the position demodulation circuit, at the same time as to the servo synchronization pattern detecting circuit and to the PLL circuit. The position demodulation circuit loads the reproduced signal at each clock of the external clock signal output from the switch, and demodulates the position information from the position of the reproduced signal loaded at the rising edge timing of the servo synchronization pattern detection trigger signal. The position information includes information indicating the track position, information indicating the sector position, and information indicating the center of the track.

The delay time correction circuit 679 calculates the delay time correction value Tn based on the data indicating the track position included in the position information (in this cycle, T0=G(r0) is calculated based on the data of the track position r0 where the magnetic head locates at first on the magnetic disk medium). The calculation result at that time is recorded in the reference correction time register as the reference correction time T0. When the delay time calculation end trigger is input, the difference between the correction value Tn and the reference correction time T0 is output. In this cycle, because of Tn=T0, the value 0 is output as the correction time data.

As described above, at the timing of the delay time calculation end trigger signal, a fixed delay time data is outputted from the delay time calculation circuit, and the correction time data (the value 0 in this cycle) is outputted from the delay time correction circuit. These data are combined, and sent to the delay circuit as the new delay time data. In this cycle, the delay time data output from the delay time calculation circuit is sent to the delay circuit without any modification.

The processes of the delay circuit, the multiplier circuit, the PLL circuit and the position demodulation circuit in this cycle are the same as the processes described above. The same operations as this cycle are performed afterwards, until the track position of the magnetic head changes.

FIG. 10(*c*)-FIG. 10(*i*) display the timing charts of each circuit in the above cycle.

FIG. 10(*c*) is a timing diagram of the servo synchronized rotation index signal. Note that FIG. 10(*c*) has the time to check the validity of the synchronization pattern detection trigger signal omitted from the diagram. As shown in FIG. 10(*c*), the servo synchronized rotation index signal is the rotation index signal, the phase of which matches that of the synchronization pattern detection trigger signal. The time difference t shown in FIG. 10(*c*) corresponds to the delay time data set from the delay time calculation circuit.

FIG. 10(*d*) shows a servo gate signal, which is the signal shown in FIG. 10(*c*) multiplied by the number of all servo areas and having a specified clock width.

FIGS. 10(*e*), (*f*), and (*g*) are timing charts of the servo gate signal output to the PLL circuit, the reproduced waveform signal of the servo pattern in the reproduced signal, and the external clock signal output from the PLL circuit, respectively. Note that one clock cycle of FIG. 10(*e*) corresponds to one clock cycle of the servo gate signal of FIG. 10(*d*). FIGS. 10(*f*) and (*g*), and additionally FIGS. 10(*h*) and (*i*) are represented in the time scale of FIG. 10(*e*).

As is obvious from the comparison between FIGS. 10(*e*), (*f*), and (*g*), one clock cycle of the servo gate signal input to the PLL circuit rises in the middle of the preamble pattern in the servo pattern reproduced from the preamplifier, and falls after the position modulation pattern. In such a manner, since the rising edge of the servo gate signal is inputted to the PLL circuit in the middle of the preamble pattern, the external clock signal, synchronized with the frequency of the preamble pattern, can be securely generated, and demodulation of the position information in the position demodulating circuit in the subsequent stage can be achieved.

FIG. 10(*h*) is a diagram showing a detection timing of the servo synchronization pattern in the servo synchronization pattern detecting circuit.

The servo synchronization pattern detecting circuit detects the servo synchronization pattern of FIG. 10(*h*), and outputs the servo synchronization pattern detection trigger signal at the time that the position modulation pattern starts.

FIG. 10(*i*) is a diagram showing the timings of demodulating the position information and outputting the position data in the position demodulation circuit.

As shown in FIG. 10(*i*), the position demodulation circuit, after the fall of the servo gate signal, outputs the position data.

Next, a timing signal (a second detection timing) generation for specifying the reproducing position of the servo pattern in the case that the magnetic head travels toward the radius direction of the magnetic disk medium (i.e. the scanned track is changed) is explained.

In this case, the magnetic head movement from the track position r0 to the track position r1 is shown. Assuming the track r0 and the track r1 are adjacent tracks and in this movement, the rising edge of the servo gate signal can catch the preamble pattern in the servo area on each track.

When the magnetic head moves from the track position r0 to the track position r1, the position information of the servo area in the track position r1 after moving in the position demodulation circuit is demodulated, and the data indicating the track position r1 is outputted to the delay time correction circuit.

The delay time correction circuit calculates the delay time correction value Tn based on the data indicating the track position r1. Since recording to the reference correction time register is limited to only the first time at the start of the position detecting circuit (in this example), a difference between the correction value Tn and the reference correction time T0 recorded in the reference correction time register is calculated at the time when the delay time calculation end trigger signal is inputted, and the difference is then outputted as the correction time data. In this cycle, the track position of the magnetic head changes to the position r1 and the correction time data is provided from G(r1)-G(r0).

As described above, the fixed delay time data is outputted from the delay time calculation circuit at the time of the delay time calculation end trigger signal, and the correction time data is outputted from the delay time correction circuit. These data are combined, and sent to the delay circuit as new delay time data. From the delay circuit, the rotation index signal is delayed by the reset new delay time and is outputted to the multiplier circuit as the servo synchronized rotation index signal.

The operations of the multiplier circuit, the PLL circuit, and the position demodulation circuit are the same as the operations explained above.

The above example demonstrates a case in which the traveling trajectory of the magnetic head forming a servo area and that of the magnetic head reading the servo area differ due to the difference in the positioning mechanism of the magnetic head, and as a result, the timing when the servo area is detected at the track position r0 and the timing when the servo area is detected at the track position r1 are different.

In such a case, by changing the track position, the reproducing position of the servo area reproduced from the preamplifier differs one track to another. In the present embodiment, the delay time of the servo synchronized rotation index signal is changed by the delay circuit in accordance with the correction time data output from the delay time correction circuit. This control is a control to match the phase of the servo gate signal input to the PLL circuit to the timing when the servo area is reproduced. Therefore, when the track position of the magnetic head changes, and the reproducing position of the servo area in the reproduced signal input to the PLL circuit changes, the servo gate signal is then inputted to the PLL circuit following to the changes, and in the PLL circuit, the external clock signal is generated from the preamble pattern in the servo area at all times. Therefore, the position demodulation circuit can accurately demodulate the position information.

In FIG. 10(c), the timing of the servo synchronized rotation index signal changes according to the correction time data output from the delay time correction circuit, is also indicated.

The signal at the time $t_o$ in FIG. 10(c) is the timing indicating the first track position of the magnetic head explained above, and the signal at the time $t_1$ additionally indicated next to the time $t_o$ is the timing of the servo synchronized rotation index signal output when the correction time data is reflected.

As shown in FIG. 10(c), a signal delayed from the signal at the time $t_o$ by the correction time is outputted as the servo synchronized rotation index signal. The signal $t_1$ becomes the signal at the time deviating forward or backward from the time $t_o$ in accordance with the correction time.

Note that when the servo synchronized rotation index signal is arranged at the time $t_1$, all timings of the signals shown in FIG. 10(d) through FIG. 10(i) deviate by the correction time (that is, the timings have the same phase as that of the signal at $t_1$).

As described above, the magnetic disk device reads the servo pattern recorded in the magnetic disk medium, and obtains the position data required for positioning control of the magnetic head.

As above, even if the trajectory of the servo pattern on the magnetic disk does not match the trajectory of the magnetic head due to the difference of the positioning mechanisms, by calculating the delay time of the reproducing position of the servo area for each radius position and by delaying the servo gate signal, it is still possible to perform the servo track signal reading equivalent to the conventional manner.

A configuration of a magnetic disk device combining a magnetic disk medium in which the yaw angle of the magnetic head is minimized by forming the servo pattern in a radial pattern, etc., and a rotary actuator positioning mechanism becomes possible. In this configuration, favorable servo information without the influence of running over due to the yaw angle can be obtained, and the data track positioning accuracy can be improved.

The present invention may be implemented by any combination of the above-described modes or other modifications and variations without departing from the main features and spirit of the invention. Thus the above embodiments are merely examples in many aspects and should not be interpreted as limitations. The scope of the present invention should not be limited by the text of the specification but what is presented by the scope of the claims. In addition, all modifications and alternative configurations, which fairly fall within the basic scope of the claims, are to be construed as the implementation of the present invention.

What is claimed is:

1. A position detecting circuit, in an information recording apparatus comprising a recording disk medium having more than one track with a servo area being formed and rotating at a prescribed speed and a head crossing each track over the recording disk medium on a prescribed trajectory and scanning each track by the rotation of the recording disk medium, for detecting a position of the head on the recording disk medium through a servo area of a track where the head is located during the rotation of the recording disk medium, comprising:

a first detection timing generator unit to generate a first detection timing of a servo area in a track on the recording disk medium; and a second detection timing generator unit to generate a second detection timing in a track different from the track where the first detection timing is generated, in accordance with a rotation traveling time based on the speed of a rotation of the recording disk medium between the position of the servo area on the track at the first detection timing and the head position on the track, wherein a delay time from a rotation start of the recording disk medium to a servo pattern being read is obtained with respect to a radial position from a phase delay that a trajectory of the head by a rotary actuator causes with respect to a radial direction axis of the recording disk medium, and is reflected in a generated delay time of a servo gate signal used at servo reading; and a deviation of a timing to read information of the servo area occurring between tracks is corrected, consequently, a read timing of the servo area follows the head traveling between tracks, and accurate position information is detected in any track.

2. The position detecting circuit according to claim 1 wherein the second detection timing generator unit comprising:

a function indicating the rotation traveling time for each of the tracks;

obtaining a difference in the rotation traveling time of another track based on a rotation traveling time of a track from which the first detection timing is generated; and generating the second detection timing by shifting the first detection timing by the difference of the rotation traveling time.

3. The position detecting circuit according to claim 2 wherein the function is a function applied when the servo area is arranged in a radial pattern from the center toward the outer circumference of the recording disk medium, and the head crosses a track on the recording disk medium so as to move in an arc.

4. The position detecting circuit according to claim 2 wherein the function is a function applied when the head is configured so as to cross a track of the recording disk medium moving in an arc, and the servo area on the recording disk medium is arranged on an arc curve with a curvature radius being larger than an arc traveling trajectory of the head.

5. The position detecting circuit according to claim 1, wherein a position of a track where the head is located can be detected from information indicating the position of the track demodulated from the servo area.

6. An information recording apparatus comprising the position detecting circuit according to claim 1.

7. The information recording apparatus according to claim 6, wherein the servo area of the recording disk medium is arranged in a radial pattern from the center of the recording disk medium to the outer circumference, and the head is configured so as to cross a track on the recording disk medium moving in an arc.

8. The information recording apparatus according to claim 7, wherein the head is connected to a rotary actuator.

9. A magnetic disk device for recording or regenerating by a magnetic head, comprising:

a magnetic disk medium on which a servo area is formed in a radial pattern;

a rotation positioning mechanism for controlling the magnetic head traveling in an arc on the magnetic disk medium to a position in the servo area; and a detection timing generation unit for determining a timing to read information of the servo area from the magnetic head, wherein the detection timing generation unit delays the timing to read information of the servo area in accordance with the radial position where the magnetic head is located on the magnetic disk medium, a plurality of tracks with concentric circles are constructed on the magnetic disk medium, a delay time from a rotation start of the recording disk medium to a servo pattern being read is obtained with respect to a radial position from a phase delay that a trajectory of the head by a rotary actuator causes with respect to a radial direction axis of the recording disk medium, and is reflected in a generated delay time of a servo gate signal used at servo reading, a deviation of a timing to read information of the servo area occurring between tracks is corrected, consequently, a read timing of the servo area follows the head traveling between tracks, and accurate position information is detected in any track.

10. The magnetic disk medium according to claim 9, wherein the timing to read the information of the servo area is the timing to detect a preamble pattern in the servo area.

* * * * *